(12) United States Patent
Yang

(10) Patent No.: US 6,343,204 B1
(45) Date of Patent: Jan. 29, 2002

(54) DETECTION AND DETERRENCE OF COUNTERFEITING OF DOCUMENTS WITH TOKENS CHARACTERISTIC COLOR AND SPACING

(75) Inventor: Xuguang Yang, Cupertino, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/382,429

(22) Filed: Aug. 25, 1999

(51) Int. Cl.[7] ............................................. G03G 21/00
(52) U.S. Cl. ........................ 399/366; 382/135; 382/137
(58) Field of Search ......................... 399/366, 17, 45; 382/135, 137, 165; 358/1.9

(56) References Cited

U.S. PATENT DOCUMENTS

| | | | |
|---|---|---|---|
| 4,039,066 A | * 8/1977 | Quigley | 399/45 |
| 4,881,268 A | * 11/1989 | Uchida et al. | 382/165 X |
| 5,638,496 A | 6/1997 | Sato | 395/109 |
| 5,678,155 A | * 10/1997 | Miyaza | 399/366 |

FOREIGN PATENT DOCUMENTS

| | | | |
|---|---|---|---|
| JP | 6-62242 | * | 3/1994 |
| JP | 8-180239 | * | 7/1996 |

* cited by examiner

Primary Examiner—Quana M. Grainger

(57) ABSTRACT

Detection and deterrence of counterfeiting permits one to make legitimate color copies without introducing visual artifacts or experiencing substantial processing delays. An efficient counterfeit deterrence is enabled by the use of an hierarchic detection scheme, in which the majority of documents are classified as free of suspicion using a simple token detection algorithm that imposes a negligible computational burden. The remainder of documents, which are labeled as suspicious, receive analysis by one or more additional detection algorithms. If the suspicious document is identified as being a secure document, this will lead to printing with selectively deteriorated service or complete denial of service. For one embodiment, tokens having a characteristic color (or colors) and spacing, are incorporated into the design of frequently counterfeited documents. The scheme uses a color look-up table (LUT) to detect an initial token having the characteristic color. Upon detection of an initial token, a search is performed based on the expected token spacing in order to locate one or more additional tokens, and to thereby verify that printing of a counterfeit is being attempted. Conventional tests for counterfeit documents can also be used as a further, higher level test. A particularly effective higher level detector uses the locations of the detected tokens to determine orientation so that the suspected area can be compared with a corresponding portion of a secure document on a pixel-by-pixel basis. The invention has negligible impact on the time to render a page and negligible effect on general images and documents, while denying printing or generating visible artifacts on banknote or other secure document images. The scheme can be deployed in a printer driver with no hardware changes and can be adjusted to arrive at a compromise that allows reasonable detection, while causing minimal effect on legitimate users. Furthermore, this method can provide a visible indicator that currency is not counterfeit. Moreover, so long as the characteristic color and spacing of the tokens does not change, no alteration is required for a new series of notes.

20 Claims, 6 Drawing Sheets

(1 of 6 Drawing Sheet(s) Filed in Color)

DETECTION AND DETERRENCE OF COUNTERFEITING OF DOCUMENTS WITH TOKENS CHARACTERISTIC COLOR AND SPACING

BACKGROUND OF THE INVENTION

1. Field of the Invention

The present invention relates to printing and, more particularly, to the prevention of printing of counterfeit currency or other documents.

2. Description of the Related Art

Modern technology has made it easy for most people to quickly and inexpensively make accurate color copies of documents. This copying can be achieved through the use of a color copier or by scanning the document and then printing it using a color printer. There are many legitimate uses for this copying technology, however a small percentage of people use color copying to make counterfeit currency or to counterfeit other documents.

One way to prevent counterfeiting is to use techniques such as are taught by Sato, "Color image input apparatus having color image identifying function", U.S. Pat. No. 5,638,496, issued, Jun. 10, 1997. Sato describes a line sensor and image input section that input a color image in a reading area containing an original, an original extracting section that extracts an area of the original from the input image, a normnalization section that normalizes an image of the extracted original area to an image of preset size, an image averaging section that converts the normalized image into an averaged image, and a brightness-hue-chroma converting section that converts the averaged image in Vcd images used as color perception amounts of a human being. A pattern matching section collates the Vcd image with dictionary data in a dictionary data storing section to determine whether or not the original is a specified type of original such as a bill, and an image output controlling section then determines whether or not image data output from the color image input section is to be output to the exterior based on the result of the identification.

Thus typical techniques such as searching for a particular pattern or color distribution can be used to detect and stop the copying of a counterfeit document. However, these techniques can be computationally intense and therefore place an undesirable delay on the copying of every document. This delay is particularly undesirable when one realizes that the majority of documents copied are made, not by counterfeiters, but by law-abiding citizens who are copying documents for legitimate purposes.

Thus, it can be seen that current counterfeiting detection and deterrence techniques impose processing delays upon color copying devices, and hinder the use of these devices in many applications.

Therefore, there is an unresolved need for a counterfeiting detection and deterrence technique that permits one to make color copies without imposing processing delays upon color copying devices.

SUMMARY OF THE INVENTION

A method and apparatus is described for detection and deterrence of counterfeiting that permits one to make legitimate color copies without introducing visual artifacts or experiencing substantial processing delays.

An efficient counterfeit deterrence is enabled by the use of an hierarchic detection scheme, in which the majority of documents are classified as free of suspicion using a simple token detection algorithm that imposes a negligible computational burden. The remainder of documents, which are labeled as suspicious, receive analysis by one or more additional detection algorithms. If the suspicious document is identified as being a secure document, this will lead to printing with selectively deteriorated service or complete denial of service.

For one embodiment, tokens having a characteristic color (or colors) and spacing, are incorporated into the design of frequently counterfeited documents. The scheme uses a color look-up table (LUT) to detect an initial token having the characteristic color. Upon detection of an initial token, a search is performed based on the expected token spacing in order to locate one or more additional tokens, and to thereby verify that printing of a counterfeit is being attempted.

Conventional tests for counterfeit documents can also be used as a further, higher level test. A particularly effective higher level detector uses the locations of the detected tokens to determine orientation so that the suspected area can be compared with a corresponding portion of a secure document on a pixel-by-pixel basis.

The invention has negligible impact on the time to render a page and negligible effect on general images and documents, while denying printing or generating visible artifacts on banknote or other secure document images. The scheme can be deployed in a printer driver with no hardware changes and can be adjusted to arrive at a compromise that allows reasonable detection, while causing minimal effect on legitimate users. Furthermore, this method can provide a visible indicator that currency is not counterfeit. Moreover, so long as the characteristic color and spacing of the tokens does not change, no alteration is required for a new series of notes.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee. The invention will be readily understood by the following detailed description in conjunction with the following drawings, wherein like reference numerals designate like structural elements, and in which.

DETAILED DESCRIPTION OF THE INVENTION

Embodiments of the invention are discussed below with reference to FIGS. 1–6. Those skilled in the art will readily appreciate that the detailed description given herein with respect to these figures is for explanatory purposes, however, because the invention extends beyond these limited embodiments.

Figure 1:
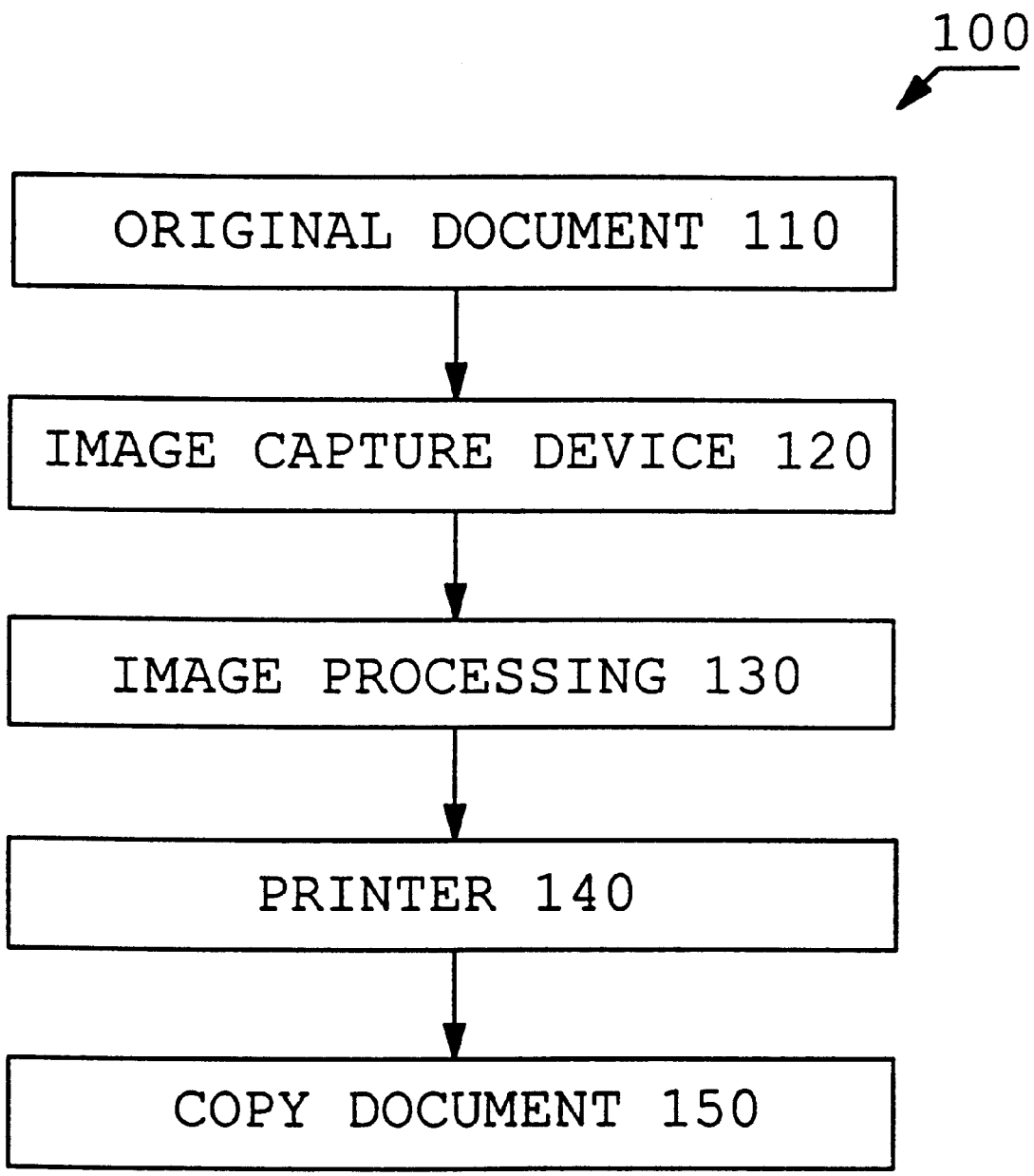
FIG. 1 is a diagram illustrating a color copying system suitable for use with a counterfeiting detection and deterrence scheme according to the present invention.

FIG. 1 is a diagram illustrating a color copying system 100 suitable for use with a counterfeiting detection and deterrence scheme according to the present invention. Image capture device 120 captures an image of original document 110. Image processor 130 processes the image captured by image capture device 120 so that printer 140 can produce copy document 150. As will be explained below in greater detail, image processor 130 has the ability to detect a token having a characteristic color (or colors) within the captured image of original document 110. In the event that two or more characteristic colored tokens are detected at a particular spacing, image processor 130 will deny or degrade printing of copy document 150 by printer 140. For example, to degrade printing, image processor 130 may change the characteristic color so that a different color is printed by printer 140 when producing copy document 150. The changed characteristic color will thus identify a copy as being counterfeit.

A banknote is an example of a secure document suitable for protection using tokens having a characteristic color and spacing. Other examples of suitable documents that may be targets of counterfeiters include: identification cards, bonds, or stock certificates. However, by marking documents with suitable tokens, the scheme can be used as a "do not copy" signal to degrade or deny copying of any other documents.

Image capture device 120, image processor 130 and printer 140 may be separate components as shown in FIG. 1. Image capture device 120 can be a scanner or digital camera, but may also include a device that graphically generates the "captured" image. Image processor 130 can be a dedicated or general purpose computer, and the image processing function can be accomplished by software (for example as a printer driver), by hardware or by firmware. Printer 140 can function by any of a variety of known printing processes using mechanisms such as toner or ink. Alternately, one or more of these components can be combined, for example, as an integral color copier that scans, processes and then prints. Note also that it is possible for the image processing function 130 to be distributed throughout the system. Thus, a portion, or even all, of the image processing function 130 could be accomplished by the image capture device 120 or by the printer 140.

Image processing function 130 permits devices to detect secure documents in order to deter counterfeiting of the secure documents. A difficulty posed by prior detection methods is that detection often requires considerable computational effort by the device. For example, it is feasible to deter counterfeiting of US currency by degrading or denying copying upon detecting the image of the President's face. In practice however, this is impractical because it would involve carefully examining every document, and would considerably slow the time to process a page. Under such a scheme, in order to deter the tiny minority of documents that are possibly counterfeit, one must impose a throughput burden on the vast majority that are legitimate.

One can enable an efficient counterfeit deterrence by the use of an hierarchic detection scheme, in which the majority of documents are classified as free of suspicion using a simple token detection algorithm that imposes a negligible computational burden. The remainder of documents, which are labeled as suspicious, receive analysis by one or more additional detection algorithms. If the suspicious document is identified as being a secure document, this will lead to printing with selectively deteriorated service or complete denial of service.

In the case of counterfeiting a US banknote, a counterfeiter will have to reproduce the following features (among others) with sufficient accuracy to pass a visible inspection:

Image of the President's face
Characteristic "banknote green" color
Fine detail of scrollwork
Round treasury seal on front of note.

A typical prior-art counterfeit detection mechanism will use a single level of testing to attempt to detect a counterfeit. In a typical conventional detection mechanism, service is denied once a feature that is present only on secure documents is detected. However, the computational effort involved in detecting a feature present only in secure documents can be very high. The allowable rate of false positives (cases where one falsely determines that a secure document feature is present) must also be very low. This is because denial of service is typically not tolerable when legitimate documents are printed. Thus, there are two preferred traits of a feature to be used in a detection mechanism:

Feature occurs only on secure documents.
Feature is easily detected.

It is extremely difficult to satisfy both constraints. For example, although an exact copy of the Andrew Jackson portrait on the US $20 bill is unlikely to appear on a legitimate document, the burden of determining that an image is sufficiently different from Jackson to permit copying can be extremely high.

Figure 2:
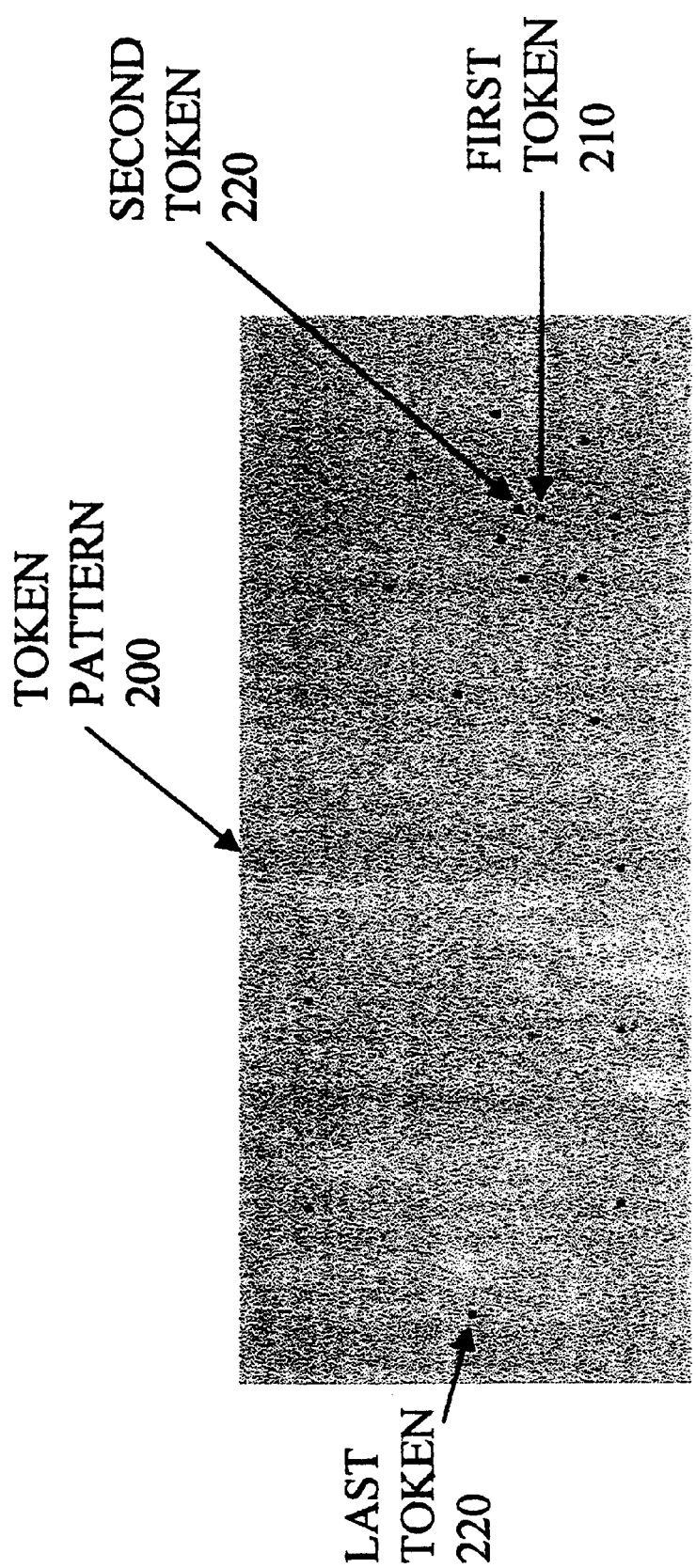
FIG. 2 is a diagram illustrating detection process flow according to an embodiment of the present invention.

FIG. 2 is a diagram illustrating multi-level detection process flow according to an embodiment of the present invention. The portion of image processing of interest begins at start bubble 210. At decision block 220, a test is made to determine whether or not counterfeiting of a color document is possible. For example, if it is known that the document being copied is to be printed as a black-and-white or grayscale copy, then it is not possible to generate a counterfeit copy of a color document. This is because the copy will not have color, so there would be no chance of confusing the non-colored copy with an original. Therefore, to save processing time in a case such as just described, there would be no need to perform additional detection. Note that test 220 is optional and could be eliminated, with the only substantial effect being that processing would occur in every case, with an attendant increase in processing delay.

FIG. 2 illustrates an hierarchic detection mechanism wherein initial detection of a suspicious event causes subsequent, (possibly more complex), detection mechanisms to be invoked. In this case, a first level detection mechanism 230 determines whether or not the document contains a token having a characteristic color. Only if the outcome of this test is positive (i.e., suspicious document detected) is the additional, detector 240 invoked to search for additional tokens (and possibly the presence of other secure features). An advantage of this hierarchic approach is that, because the first detection mechanism sends suspicious documents to a potentially more complex algorithm for further inspection, the first detection mechanism can have a higher false positive rate. If the first level detection correctly classifies the majority of legitimate documents as being "unsuspicious", it will have negligible impact on the majority of documents printed and will still allow a complex detection mechanism to be employed at the second level. Thus, two desirable traits of our first level detection scheme are:

It has negligible impact on the throughput of the device (for example, the time taken to print a page should be impacted only very slightly)
It correctly classifies the vast majority of legitimate documents as being "unsuspicious" while classifying almost all counterfeit documents as being suspicious.

The second (or higher) level detection mechanism 240 has the trait that it should distinguish accurately the legitimate from the counterfeit documents among all those passed to it as "suspicious." Because this second detector processes only a small portion of the pages printed when the printer is used for legitimate purposes, it can be allowed to have a greater impact on the time taken to process a page than the first level detection. Thus our second level detection scheme can even have far looser constraints than the detection mechanism used in a conventional system. The looser constraints make its design far easier than designing a single mechanism which must process every image as quickly as possible without error. However, the second stage need not be more complex than the first. For some circumstances and tests, it may be sufficient to confirm a suspicious document as a counterfeit attempt after detecting two (or more) different suspicious characteristics in two (or more) respective stages (e.g., one per stage). Thus, in the simplest case, the detection of a second token, at a predetermined distance from the initially detected token, would be adequate to confirm that an attempt is being made to copy a secure document.

If it is determined in decision block 240 that an attempt is being made to print a secure document, then printing is denied or degraded 280 before termination 290. Otherwise, after counterfeiting has been ruled out, the document is printed 270 before termination 290.

Note that second level detection scheme 240 can continue testing the remainder of the page being copied, or alternatively, second level detection scheme 240 can restart at the beginning of the suspicious page, and retest the entire page at the second level.

Also note that it is possible to begin degradation of image quality as soon as a document has been identified by first level detection 230 as being suspicious. Then if it is determined in decision block 240 that an attempt is being made to print a secure document, printing can be denied or further degraded 280 before termination 290. Otherwise, after counterfeiting has been ruled out, the document is printed 270 with slight (possibly unnoticeable) degradation before termination 290.

Prevention of counterfeiting actions on digital reproduction devices (such as scanners, printers, and copiers) usually requires the recognition of the underlying documents at the device level. A key problem that confronts most detection methods is the limited processing power at the device level, for example, of the device drivers. Here, the incorporation into the document of a number of tokens, e.g., small dots with a special color. The distance relationships amongst the tokens are carefully configured so that a reliable detection can be accomplished in a computationally trivial manner. Thus, these special design features can be introduced into a secure document to facilitate a fast and robust detection.

The design is motivated by the fact that any two points completely determine a two-dimensional coordinate system. Therefore, if one can track two special check points (i.e., tokens) with sufficient accuracy, the entire document can be reliably aligned under any translation and orientation. The scheme is explained as follows. One plots a series of n+1 small dots, $P_0, P_1, \ldots, P_n$, using a particular color on the document. For one embodiment, these tokens are arranged in such a way that the distance between $P_0$ and $P_1$ is d, which can be any small amount, provided that these two points can be clearly distinguished. The distance between $P_1$ and $P_2$ is 2d, and that between $P_2$ and $P_3$ is 3d and so on. Likewise, the i th point has a distance of exactly id to its predecessor, the i−1 th point. In addition, for one embodiment, the constraint is imposed that for the i th point, the i−1 th one is its closest neighbor, i.e., all other check points are a distance larger than id to the i th point.

Figure 3:
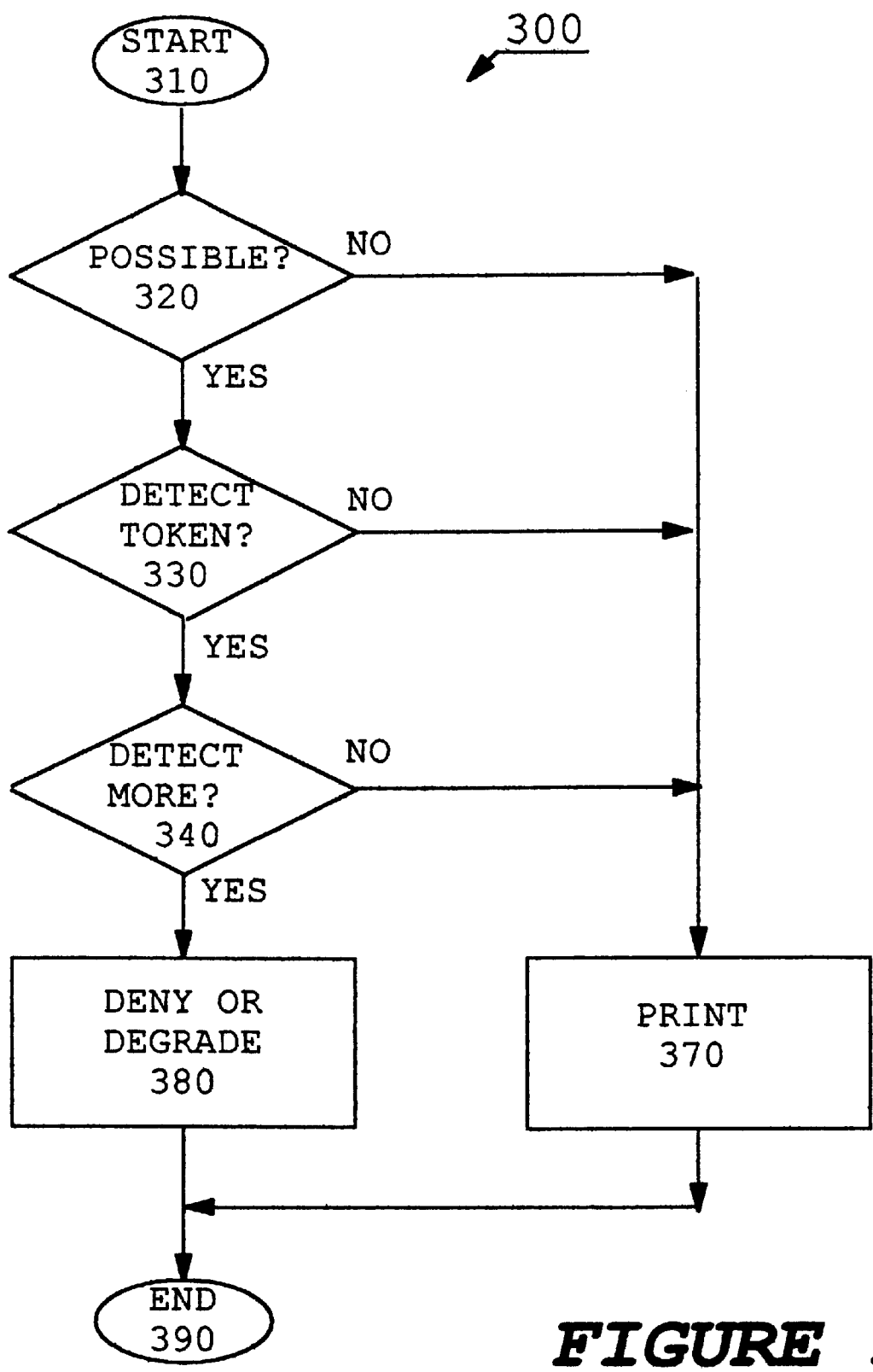
FIG. 3 is a diagram illustrating a token spacing pattern suitable for use with a counterfeiting detection and deterrence scheme according to the present invention.
Figure 6:
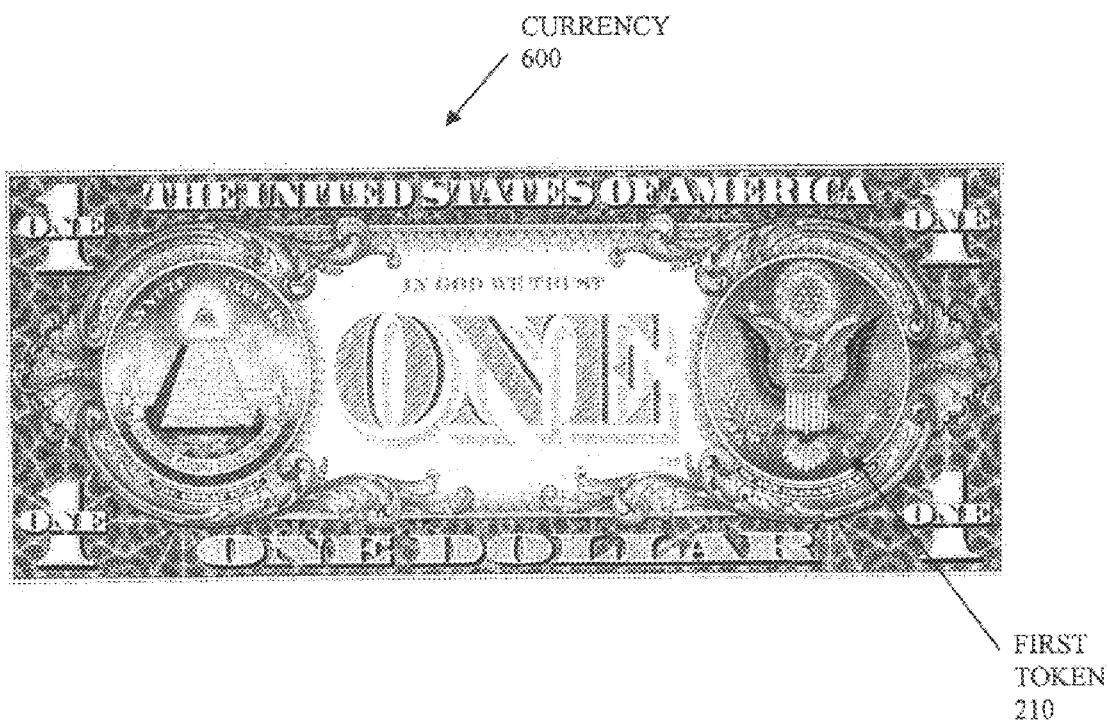
FIG. 6 is a diagram illustrating currency having tokens with a characteristic color and spacing according to an embodiment of the present invention.

FIG. 3 is a diagram illustrating a token spacing pattern suitable for use with a counterfeiting detection and deterrence scheme according to the present invention. In FIG. 3, 18 dot token pattern 300 is placed on a secure document shown in gray. The distance from first token 310 to second token 320 is d. Similarly, the distance from second token 320 to third token 330 is 2d. Finally, the distance from penultimate token 340 to last token 350 is 17d (which is equal to 18−1)d). FIG. 6 is a diagram illustrating currency having tokens with a characteristic color and a spacing similar to that of FIG. 3. In FIG. 6, the characteristic color is a pink-magenta and the dot configuration has d=$\frac{1}{15}$ inch for the US Dollar bill shown (though not shown to scale). However, unlike the pattern of FIG. 3, an initial spacing of d would cause the first two closest tokens to appear to be too close together. Therefore, for aesthetic reasons, an extra distance d is added to each token spacing. Thus, the first dot spacing is 2d, the second dot spacing is 3d and the last dot spacing is 18d. In general, the spacing is D+id, where D=d (though for an alternative embodiment, D could be any other distance).

Note that in the spacings of the patterns of FIGS. 2 and 6, each of the distances is a multiple of d. With such an arrangement, the detection is computationally trivial. We store in our printer driver the checkpoint coordinates of our original design as a lookup table, in which the i th row contains the x and y coordinates of the i th check point. Whenever we encounter the special color at page rendering, we search in its neighborhood for the closest pixel with the same color. If this is found, we check to see whether the distance happens to be a multiple of d. If true, and suppose the distance is jd, then a suspicion is raised because they could very possibly be our j and j−1 checkpoints (judging from their closest neighboring, color and distance).

Figure 4:
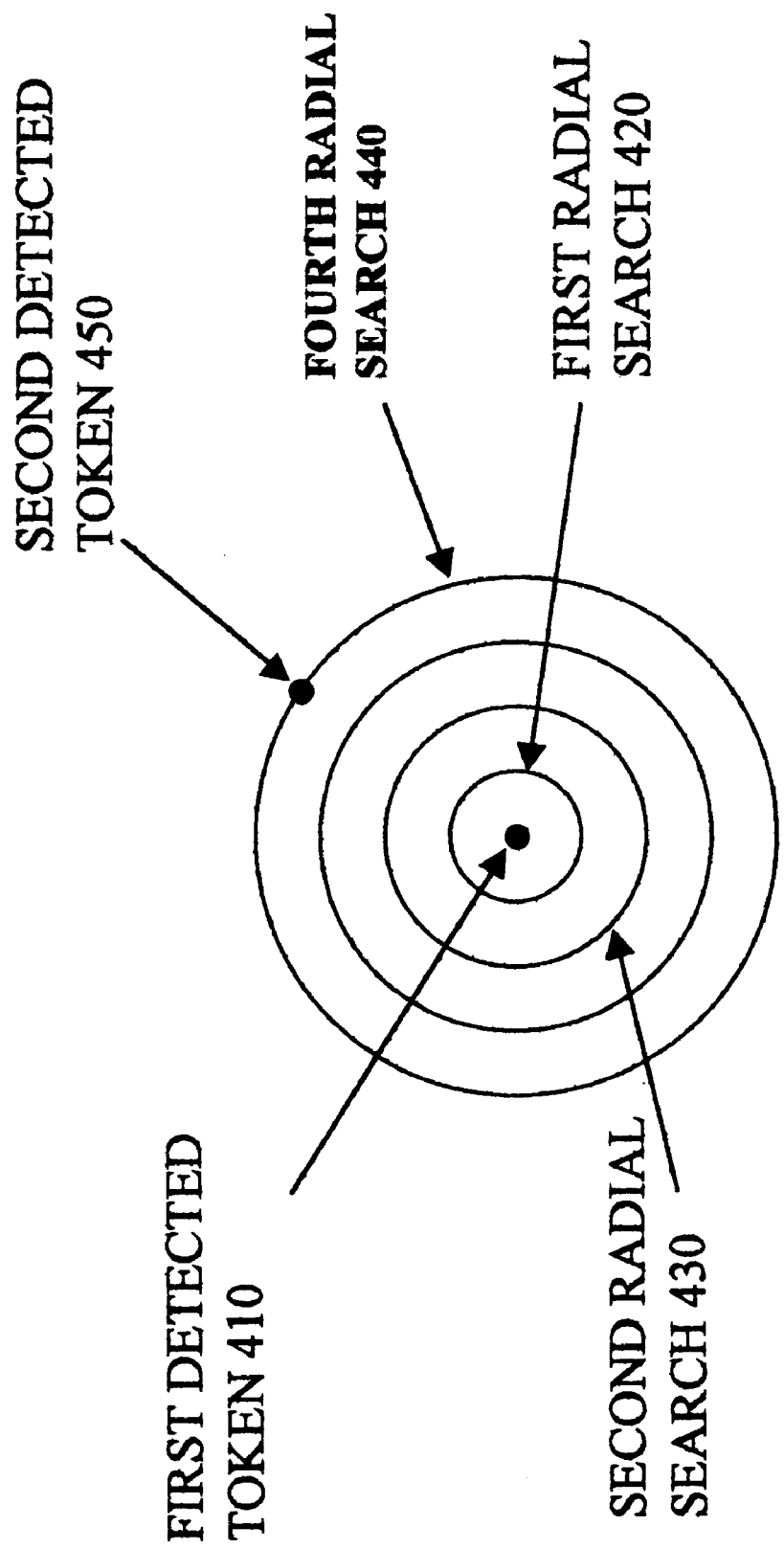
FIG. 4 is a diagram illustrating radial search and detection according to an embodiment of the present invention.

FIG. 4 is a diagram illustrating radial search and detection according to an embodiment of the present invention. In FIG. 4, token 410 is the first token detected. Upon detecting token 410, a first radial search 420 is made along the perimeter distance d from token 410. Because no token is found in the first radial search, second radial search 430 is made along the perimeter distance 2d from token 410. This process is repeated using integrally incremented multiples of d until second token 420 is detected (in this case at distance 4d) or, if there are N tokens, until N−1 radial searches have been performed.

After two tokens have been detected, one can further verify the suspicion raised by finding these two tokens which have the same spacing as that of the pattern. One can use the coordinates of these two pixels, together with those of our j and j−1 checkpoints given in the lookup table, to determine the translation and rotation needed to align the entire document. Particularly, one can further track other check points, whose new coordinates are found by applying the translation and rotation to those in the table, to possibly gather more and more evidence. Every time another check point is found at the expected location, the suspicion level is raised yet again. Then, depending on the importance of the documents, or other factors, a prevention action, (e.g., introduction of visible artifacts) can be applied when a preset suspicion level is reached.

The computational complexity of the detection scheme is clearly very small. The search starts with a neighborhood search around the first suspicious point. Because the next pixel is expected to be at least a distance of multiples of d, one in fact only needs to examine those locations satisfying this condition, which gives at most n−1 concentric circles. At the detection of the second suspicious point, one can compute the translation and rotation (parameterized by an angle) from the coordinates, and then apply them to find the new coordinates of other check points. All of this processing only takes a few elementary arithmetic operations.

In the above examples, a spacing scheme is used wherein token spacing is determined by the distance between two particular nearest neighboring tokens. Alternatively, spacing distances within a pattern can all be calculated from a particular reference token. Thus for an 18 token pattern embodiment, if the first token is the reference token, the distance from the first token to second token could be d. Similarly, the distance from the first token to last token could be 17d (which is equal to 18−1)d). Also note that although it is convenient to search on concentric circles that increase in radius by an integral multiple of d, any set of predetermined radii could be used.

Furthermore, note that the storage requirement to perform the detection is also negligible. The scheme requires only a small array holding the coordinates of the check points. In addition, there are some other important advantages.

A first advantage is that the design requires only small changes in the existing documents. Except for adding a few small dots, it does not affect the features and appearance of the original documents. Therefore, the social, economic, and psychological effects caused by the changes will likely be small. In fact, the tokens could be marked and then detected in an alternative embodiment using a non-visible "color" (e.g., infrared or ultraviolet markings). However, the presence of a visible token pattern helps to add credibility to a document being examined by a recipient (such as when a merchant receives cash payment in the form of a bill having the tokens). One should also note that other shapes for the tokens could be used, the tokens need not be dots. For example, a simple bow-tie shaped token could be used. This would have the benefit that, upon first detection of the characteristic color, the nearest neighboring pixels could be examined to see if there are neighboring pixels that together form an approximately bow-tie shape. If not, then a token was not found at that location, and there is no need to proceed further with a radial search for more tokens. Patterns of varying shaped (and possibly colored) tokens would also make it more difficult for the counterfeiter to defeat the system by stripping off the tokens, printing copies of the token-less secure documents and then hand stamping the token pattern back onto the counterfeit copies.

Another advantage is that the design is universally applicable to any type of document. Moreover, the large amount of design freedom under the distance constraints can be used to make the pattern best adapt to the host document (e.g., for aesthetic considerations).

Furthermore, because check points are distributed over the entire document, the detection is robust to many accidental damages, such as cropping, smearing, or erasure.

Moreover, the detection offers a successive range of tradeoff between computational complexity and detection accuracy, which can be fine-tuned to each particular type of application and documents. For example, for very important applications, one may want to be more cautious about avoiding false positive detections. Therefore, one would spend more computation time and only take a prevention action when a very high level of suspicion is reached. At the extreme case, one may even compute the aligned version of the entire document and make comparison on a pixel-by-pixel basis. For less stringent applications, however, one may care less about detection accuracy and can tolerate a higher false positive (or false negative) detection rate. Therefore one can choose to save computation time by setting a lower detection threshold.

Figure 5:
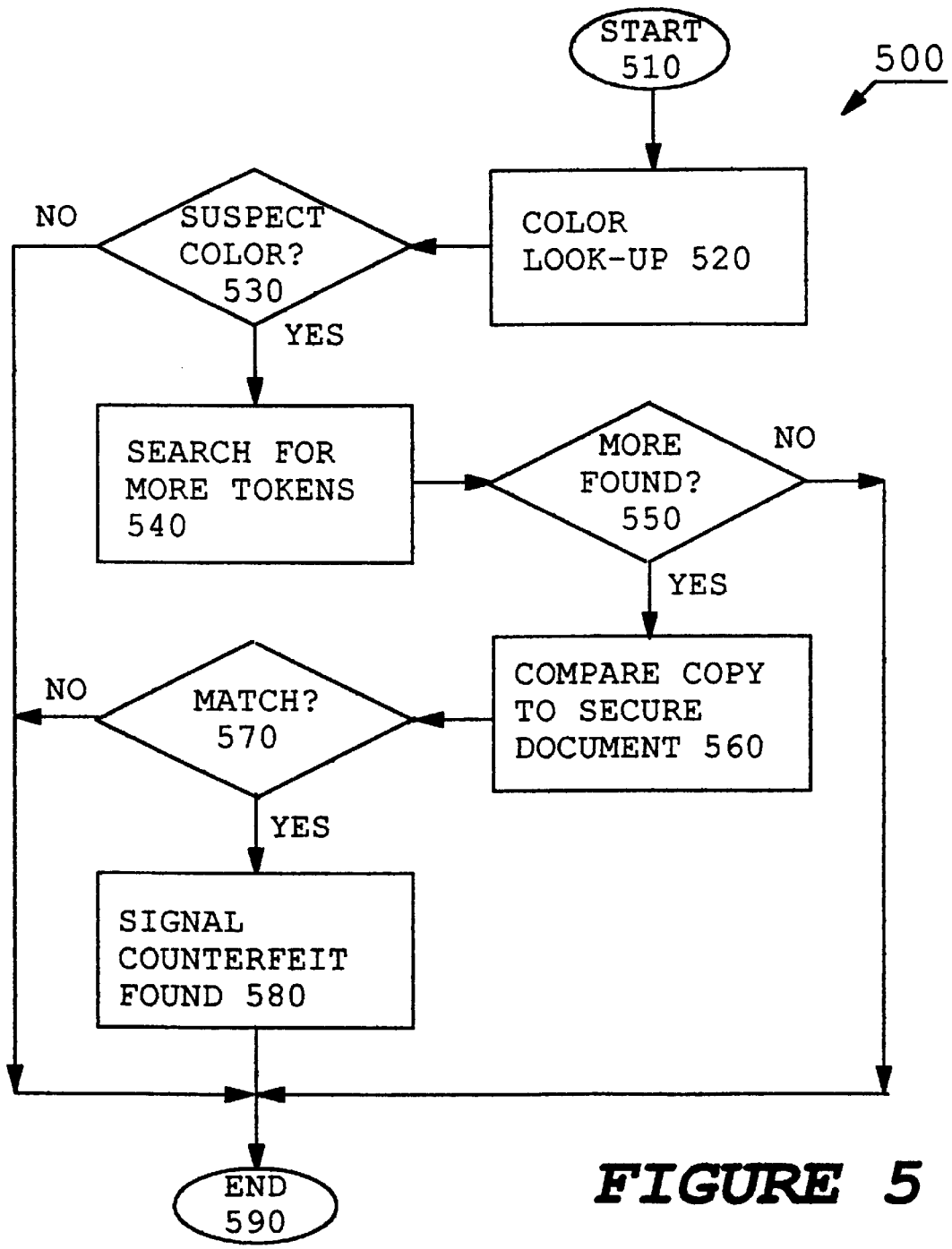
FIG. 5 is a diagram illustrating the detection process according to an embodiment of the present invention.

FIG. 5 is a diagram illustrating multi-level detection process flow according to a color look-up table embodiment 500 of the present invention. The portion of image processing of interest begins at start bubble 510.

In process block 520 a color look-up is performed for the pixel of interest. That is to say that a color mapping is performed from one color space to another using a color look-up table. For example, an input device may record a captured document using the RGB (red-green-blue) color space, but the printer may print documents using the CMYK (cyan-magenta-yellow-black) color space. If the pixel of interest has a color represented in the RGB color space, a color look-up table (LUT) can be used to find the corresponding CMYK value.

A test is then performed in decision block 530 to determine whether or not the pixel of interest has a suspect color, i.e., a color that is the same, or close to, the characteristic color of the token. If the color look-up is for some color other than the characteristic color, then the pixel value for the printed image that has been obtained from the LUT is returned and this portion of processing for the pixel of interest ends 590.

If it is determined in decision block 530 that the color look-up was for a color that is the same, or close to, the characteristic color, then a search is conducted in process block 540 to see if one or more additional tokens can be found at the predetermined distances of the token pattern. Based on the search, a test is then performed in decision block 550 to determine whether or not additional pixels that correspond to the characteristic color have been identified at any of the predetermined distances. If more tokens have not been found, then the pixel value for the printed image that has been obtained from the LUT is returned and this portion of processing for the pixel of interest ends 590.

If it is determined in decision block 550 that more tokens have been found, then a suspicious document has been identified and it is possible to proceed directly from decision block 550 to block 580 and signal that a counterfeit was found. As mentioned previously, the signal can include degradation or denial of printing of the copy.

Alternatively, any of the counterfeit detection tests known in the art can be performed on the suspicious document. For example, as shown in FIG. 5, the detected tokens can be used as orientation references and a comparison can be made to a secure document. The process block 580 signal that a counterfeit had been found would only be made if decision block 570 confirms that the comparison matched.

Returning to the initial token detection mechanism, this test can be performed using either a look-up table (LUT) especially designed for the purpose, or using one already in use in the printer, scanner or software pipeline.

Many devices use a LUT to convert between color spaces such as RGB and CMYK. In this case we identify that region of the LUT input space to which suspicious pixels belong. Then, along with the output of the LUT, we pass an extra parameter indicating whether the accessed color was in the suspicious region or not. If there is no LUT in use in the device pipeline, the specially designed LUT can have as output only the parameter indicating whether the input belongs to the suspicious region or not.

Considerable freedom is available in choosing the colors of tokens to be used in determining suspicion. Colors that commonly appear in large amounts on legitimate documents (e.g. skin tones, sky blue, grass, and black) make poor choices, while colors that are less common are good candidates. For some documents, detection of several different colors is better than reliance on detection of one color. For example, if each of seven different colors appears in legitimate documents with probability 0.1 (i.e., each color appears on about 10% of documents), appearance individual tokens, or patterns of tokens, of all seven colors would occur in only one legitimate document in ten million (assuming independence).

Detecting the suspicious colors can be performed using in a look-up table (LUT), either specially designed for the purpose, or already in use in the printer, scanner or software pipeline. If the LUT is already part of the pipeline, a parameter can be added to the output of the LUT to indicate when a suspicious region of the LUT input space has been accessed. If more than one color is being detected, one or more parameters can be returned by the LUT to indicate which color was detected. Note that if the LUT is designed only for this detection purpose, these parameters may be the only output of the LUT.

Implementation details of the first and second level detection mechanism will vary depending on the constraints of the device on which it is to implemented. Color conversion LUTs are commonly smaller than the input space of the image. That is, the LUTs do not contain an entry for every possible input, but have entries for some portion of the possible inputs, and have an interpolation algorithm to expand them. For example although the LUT for a 24-bit RGB image ideally ought to be 256*256*256, a far smaller table, say 30*30*30, will often suffice.

Even so, if memory size is critical, the LUT can consume considerable space. This factor is especially important when designing an ASIC. In such a case, the extra bit (or bits) per entry needed to detect the tokens, might have a non-negligible cost impact on the detector. Because the bits added to the LUT in the first-level detection are not required to reproduce accurate colors, and are used merely to characterize regions of the LUT as being suspicious, it is possible to employ yet a smaller LUT, of size, say 6*6*6, that will be used exclusively for the detection of suspicious regions of color. This additional LUT will take far less memory space than would be needed to combine the color conversion and suspicious color detection functions into one LUT. Accesses to this table could be used before or after the accesses to the main color conversion LUT, or could be accessed in parallel, if the hardware or software architecture permits parallel computation.

Note also that detection of the tokens need not be performed during color look-up, but could be performed at any suitable point in the image pipeline, perhaps even as a preprocessing or postprocessing operation.

Returning to the additional higher level tests, an example of a method suitable for the second level detection is one that detects some visible mark or geometric feature. As pointed out earlier, efficiency of the higher level detection mechanism is no longer as critical, because very few pages will ever be examined by this detector. Any scheme that detects any characteristic feature or series of features on the note will serve. A preferred characteristic of the higher level detection mechanism is that, once the lower-level detection has characterized the page as suspicious, there should still be a sufficient amount of the note remaining to be printed to permit the higher level detection to make an unambiguous decision. However, alternatively, the higher level detection could reprocess an entire document after it had been identified as suspicious.

It should be clear that one could use various different actions when a suspicious event is found. One could refuse all further function by stopping the rendering process. In certain cases it may be desirable to deteriorate selectively the rendering, once the first level detection has classified a document as suspicious. This could occur in addition to, or instead of, the higher level detection mechanism. Preferably, deterioration should affect aspects of the printer's capability that matter more for counterfeit copies than for legitimate documents. These include individual or combinations of the following:

Deliberate mis-rendering of color. Once a threshold amount of a suspicious color is detected, this color can be mis-rendered by modulating the color with a function of the amount used.

Deliberate mis-registration. Addition of a small, unpredictable jitter to the coordinates on the physical page from which rendering begins will make accurate registration between sides of the page extremely difficult.

Deliberate deterioration of halftoning. Substitution of a poorer quality dither matrix, or substitution of non-optimized weight for error diffusion will make reproduction of accurate detail more difficult.

To summarize, the present invention has the following advantages:

It causes negligible impact on time to render a page.

It has negligible effect on general images and documents, while generating visible artifacts on banknote images or denying their printing.

It can be deployed in the driver with no hardware changes.

The detection function can be changed or fine-tuned to trade-off between speed and accuracy.

The area of the LUT that is classified as suspicious can be adjusted to arrive at a compromise that allows reasonable detection, while giving minimal effect on legitimate users.

Only minimal redesign of currency or other secured documents is required.

Furthermore, so long as the characteristic color or pattern does not change, no alteration is required for a new series of notes.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An apparatus for deterring counterfeiting of documents, the apparatus comprising:

a first-level detector adapted to detect an initial token having a characteristic color and to thereby quickly eliminate from suspicion a majority of types of the documents without the initial token as legitimate while identifying a minority of types of the documents with the initial token as potentially counterfeit documents;

a second-level detector adapted to further test the potentially counterfeit documents identified by the first-level detector to search for a second token spaced at one of a set of one or more predetermined distances from the initial token, such that detection of the second token can verify which of the potentially counterfeit documents are counterfeit copies; and an alarm adapted to signal detection of the counterfeit documents by the second-level detector.

2. The apparatus as set forth in claim 1, wherein there are at least two of the predetermined distances, the second-level detector comprising:

a third-level detector adapted to further test the potentially counterfeit documents identified by the second-level detector to search for a third token, spaced at a different predetermined distance from the initial token, than the distance between the initial token and the second token, such that detection of the third token can verify which of the potentially counterfeit documents are counterfeit copies.

3. The apparatus as set forth in claim 2, wherein the predetermined distances increase by integral multiples of a predetermined amount.

4. The apparatus as set forth in claim 1, the second-level detector comprising:

a third-level detector adapted to use orientation information, derived from the initial and second token locations, to compare a portion of the secure document to a corresponding portion of the potentially counterfeit document to further test the potentially counterfeit documents identified by the second-level detector, such that detection of a match between the portion of the secure document and the potentially counterfeit document can verify which of the potentially counterfeit documents are counterfeit copies.

5. The apparatus as set forth in claim 1, wherein the first-level detector comprises:

a color detector adapted to detect look-up in a color look-up table of pixels having a color corresponding to the characteristic color, the pixels being part of a captured image to be printed.

6. The apparatus as set forth in claim 5, wherein the look-up table converts from a first color space value of the captured image to a second color space value of the page to be printed.

7. The apparatus as set forth in claim 1, wherein the alarm signals detection of the counterfeit documents by denying printing.

8. The apparatus as set forth in claim 1, wherein the alarm signals detection of the counterfeit documents by degrading printing.

9. The apparatus as set forth in claim 1, comprising a printer to print a page to be printed.

10. The apparatus as set forth in claim 1, comprising a capture device to capture an image of the document to be printed.

11. A method for deterring counterfeiting of documents, the method comprising the steps of:

first-level detection to detect an initial token having a characteristic color and to thereby quickly eliminate from suspicion a majority of types of the documents without the initial token as legitimate while identifying a minority of types of the documents with the initial token as potentially counterfeit documents;

second-level detection to further test the potentially counterfeit documents identified by the first-level detection to search for a second token spaced at one of a set of one or more predetermine distances from the initial token, such that detection of the second token can verify which of the potentially counterfeit documents are counterfeit copies; and signaling detection of the counterfeit documents by the second-level detector.

12. The method as set forth in claim 11, wherein there are at least two of the predetermined distances, the second-level detection comprising the step of:

third-level detection to further test the potentially counterfeit documents identified by the second-level detection to search for a third token spaced at a different predetermined distance from the initial token than the distance between the initial token and the second token, such that detection of the third token can verify which of the potentially counterfeit documents are counterfeit copies.

13. The method as set forth in claim 12, wherein the predetermined distances increase by integral multiples of a predetermined amount.

14. The method as set forth in claim 11, the second-level detection comprising the step of:

third-level detection using orientation information, derived from the initial and second token locations, to compare a portion of the secure document to a corresponding portion of the potentially counterfeit document to further test the potentially counterfeit documents identified by the second-level detection, such that detection of a match between the portion of the secure document and the potentially counterfeit document can verify which of the potentially counterfeit documents are counterfeit copies.

15. The method as set forth in claim 11, wherein the first-level detection comprises the step of:

color detection to detect look-up in a color look-up table of pixels having a color corresponding to the characteristic color, the pixels being part of a captured image to be printed.

16. The method as set forth in claim 15, wherein the look-up table converts from a first color space value of the captured image to a second color space value of the page to be printed.

17. The method as set forth in claim 11, wherein the detection of the counterfeit documents is signaled by denying printing.

18. The method as set forth in claim 11, wherein the detection of the counterfeit documents is signaled by degrading printing.

19. The method as set forth in claim 11, comprising the step of printing a page to be printed.

20. The method as set forth in claim 11, comprising the step of capturing an image of the document to be printed.

\* \* \* \* \*